United States Patent
Yoshida

[19]

[11] Patent Number: 5,890,762
[45] Date of Patent: Apr. 6, 1999

[54] CHILD SEAT

[75] Inventor: Junichi Yoshida, Shiga, Japan

[73] Assignee: Takata Corporation, Tokyo, Japan

[21] Appl. No.: 115,535

[22] Filed: Jul. 15, 1998

[51] Int. Cl.$^6$ ..................................................... A47C 1/08
[52] U.S. Cl. ............................... 297/256.13; 297/256.16; 297/130
[58] Field of Search ............................... 297/253, 256.1, 297/256.13, 256.16, 130

[56] References Cited

U.S. PATENT DOCUMENTS 3,404,917 10/1968 Smith ..................................... 297/256.1
5,052,750 10/1991 Takahashi et al. ................. 297/256.13

FOREIGN PATENT DOCUMENTS 404342621 11/1992 Japan ................................ 297/256.13
2262031 6/1993 United Kingdom .............. 297/256.13

*Primary Examiner*—Laurie K. Cranmer
*Attorney, Agent, or Firm*—Kanesaka & Takeuchi

[57] ABSTRACT

A child seat capable of easily adjusting its reclining angle. The child seat is placed on a vehicle seat, and the tongue of a seat-side belt and the buckle of a belt are latched to each other. Then, the dial is turned to wind the belt to fix the child seat to the vehicle seat. To adjust the reclining angle, a lock-releasing lever is pulled to pull out seat-fixing pins from pin through holes and to pivot an arm portion by a link bar so as to release the locking of the winder.

4 Claims, 7 Drawing Sheets

CHILD SEAT

FIELD OF THE INVENTION

The present invention relates to a child seat in which an infant may be seated, more particularly to a child seat which is structured to be fixed to a vehicle seat, which is previously provided with a latch member, by latching a child-seat-fixing belt with the latch member, and tightening up the belt.

BACK GROUND OF THE INVENTION

The following structure is one of conventional structures for fixing a child seat, in which an infant may be seated, to a vehicle seat. The vehicle seat is previously provided with a latch member. The child seat is provided with a belt winder in which a belt is wound. The belt is withdrawn from the belt winder, the end of the belt is latched to the latch member, and the belt is then tightly wound by the belt winder (JPA 5-254367). In this conventional example, the belt is wound by gripping and turning a disk-like operating knob.

Some child seats have reclining mechanism. Such a child seat comprises a seat body in which a child is seated, a frame slidably supporting the seat body, and a locking device for locking the seat body to the frame for stopping the sliding. The seat body can be reclined by sliding the seat body on the frame like drawing an arc.

When the child seat capable of reclining is fixed to the vehicle seat by the aforementioned belt winding mechanism of JPA 5-254367, two motions: loosing the belt of the belt winding mechanism and releasing the lock of the locking device of the reclining mechanism are required to change the reclining angle of the seat body. Therefore, the operation of the child seat is complex.

OBJECT AND SUMMARY OF THE INVENTION

The present invention is made in consideration of the aforementioned prior arts and its object is to enable a child seat fixed to a vehicle seat to be easily changed in its reclining angle.

A child seat of the present invention comprises a seat body in which a child may be seated, a frame supporting the seat body in such a manner the seat body can move in a reclining direction, a locking means for locking the movement of the seat body in the reclining direction to fix the seat body to the frame, and a lock-releasing lever for releasing the locking of the locking means, further comprises a winder provided to the child seat for fixing the child seat relative to a vehicle seat, a webbing being withdrawn from the winder and latched to a latching member of the vehicle seat, and a blocking means for blocking the withdrawal of the webbing from the winder, and is characterized in that when said lock-releasing lever is moved in a lock releasing direction, the blocking of the blocking means is released.

In the above child seat, the operation of the lock-releasing lever can achieve both the releasing of the locking of reclining and the releasing of the blocking of the blocking means.

According to the present invention, it is preferable that as the lock-releasing lever is moved in the lock releasing direction, the locking of the locking means of said seat body is first released and, after that, the blocking of said blocking means is released. In this structure, to adjust the reclining angle of the seat body of the child seat fixed to the vehicle seat in a direction standing the seat back of the seat body, it is enough to pull the lock-releasing lever a little to release only the locking of the seat body relative to the guide rails.

Then, the reclining angle of the seat body is adjusted in the direction standing the seat back. As the winder is attached to the seat body, the webbing tensioned between the winder and the vehicle seat is loosed. The webbing is wound and tensioned by operating the winder to securely fix the child seat to the vehicle seat again. In this manner, the releasing of the blocking of the blocking means is not required to adjust the reclining angle of the child seat already fixed to the vehicle seat.

According to the present invention, it is preferable that the winder comprises a winding shaft onto which the webbing is wound, a handle for turning the winding shaft in a winding direction, a ratchet wheel which rotates integrally with the winding shaft and has teeth on the outer surface thereof, and a ratchet wheel stopper capable of being in an attitude engaging one of the teeth of the ratchet wheel to prevent the rotation of the winding shaft in a direction of withdrawing the webbing, and in another attitude spacing from the teeth to allow the rotation of the winder, wherein the ratchet wheel stopper moves apart from the teeth by the movement of the lock-releasing lever in a lock-releasing direction.

According to the present invention, it is preferable to provide a means of slipping the handle after torque transmitted from said handle to said winder reaches a predetermined value. The predetermined value of torque is set to enable to apply enough tension on the belt to fix the child seat relative to the vehicle seat. Turning the handle until the handle slips to rotate securely fixes the child seat relative to the vehicle seat.

DESCRIPTION OF THE PREFERRED EMBODIMENT

Hereinafter, an embodiment will be described with reference to the drawings.

Figure 1:
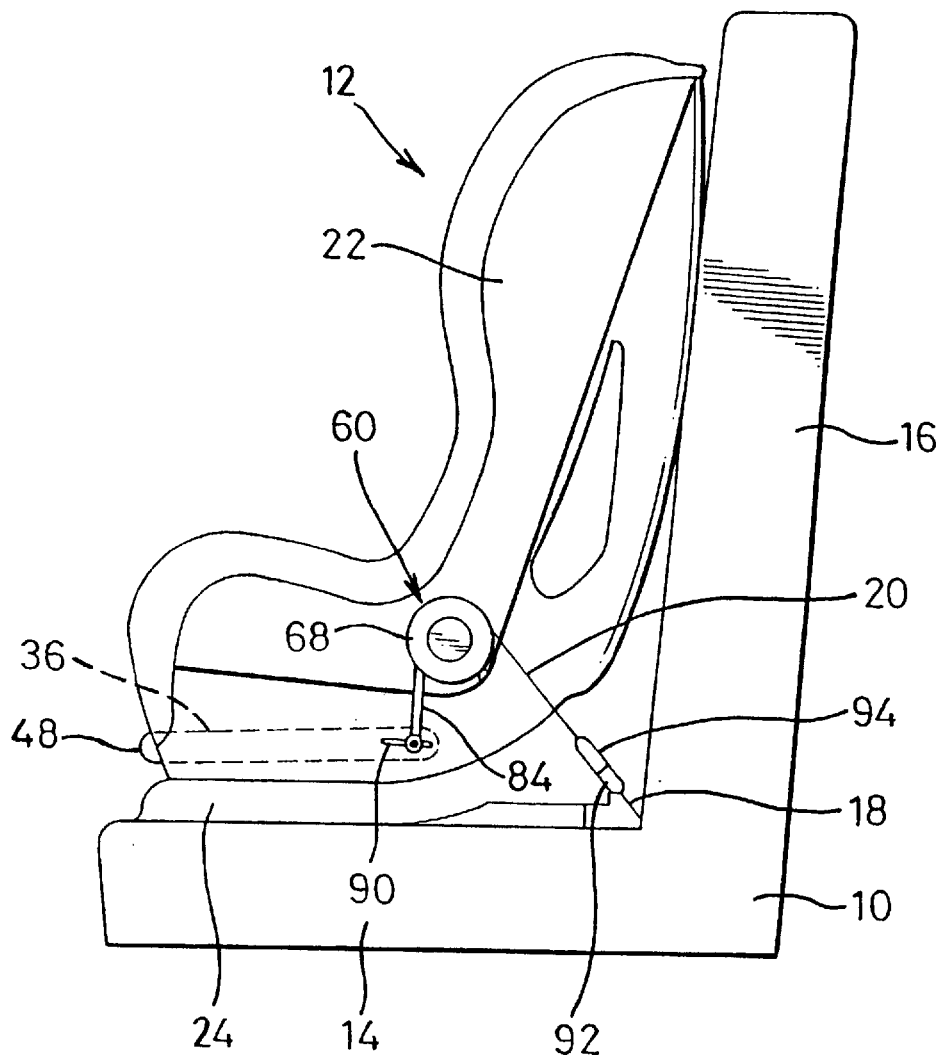
FIG. 1 is a side view showing a child seat according to an embodiment in a state that it is fixed to a vehicle seat.
Figure 2:
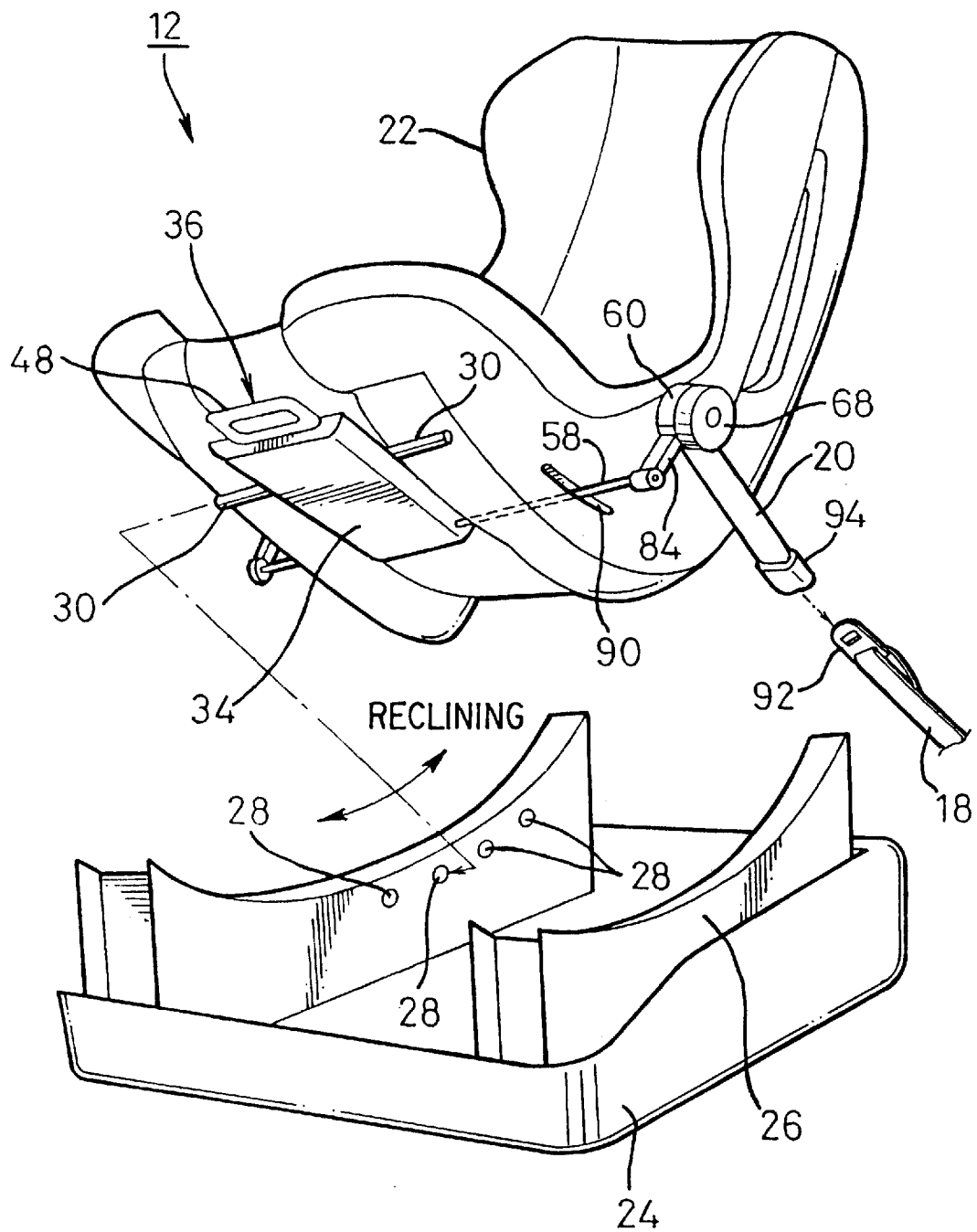
FIG. 2 is an exploded perspective view of the child seat according to the embodiment.
Figure 3:
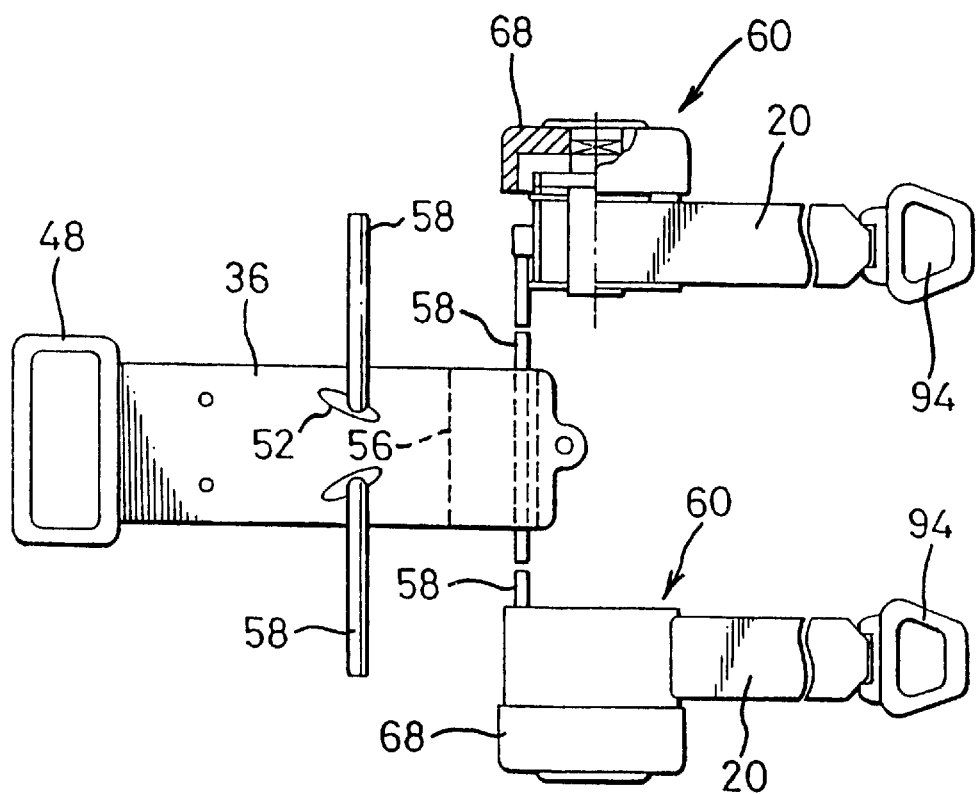
FIG. 3 is a plan view showing a locking mechanism of the child seat according to the embodiment.

As shown in FIGS. 1, 2, a child seat 12 is placed on a vehicle seat 10 and the child seat 12 is fixed by a belt (webbing) 20 latched to a seat-side belt attached adjacent to a corner between a seat cushion 14 and a seat back 16 of the vehicle seat 10.

The child seat 12 comprises a seat body 22 in which a child is seated and a frame 24 supporting the seat body 22 in such a manner that the seat body 22 can recline. The frame 24 is provided with a pair of guide rails 26. The bottom surface of the seat body 22 is designed to slide along the guide rails 26 for reclining.

The guide rails 26 are formed with pin-through holes 28. Seat fixing pins 30 provided on the bottom portion of the seat body 22 and extending in the width direction of the seat are inserted into the pin-through holes 28, thereby fixing the seat body 22 relative to the guide rails 26.

Fixed to the bottom surface of the seat body 22 is a lever casing 34 in which a lock-releasing lever 36 is accommodated so as to allow the lever to move in the back-and-forth direction of the seat.

Figure 4:
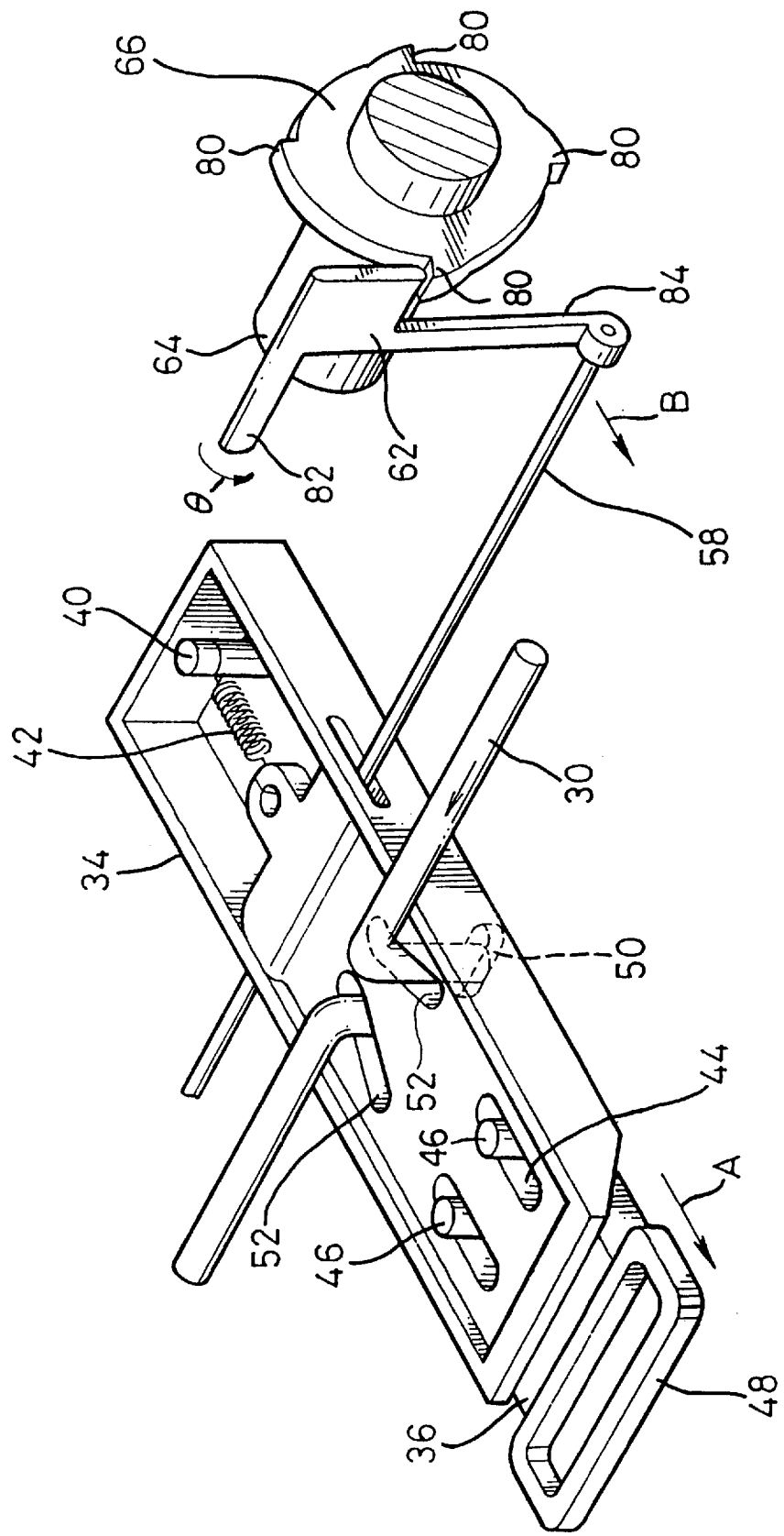
FIG. 4 is a perspective view of the locking mechanism according to the embodiment.

As shown in FIG. 4, the lever casing 34 and the lock-releasing lever 36 are each formed in rectangle extending in the back-and-forth direction of the seat. The lock-releasing lever 36 is biased rearward by an extension spring disposed between a stay 40 fixed to a rear portion of the lever casing 34 and a rear end of the lock-releasing lever 36.

The lever 36 is formed with guide slits 44 extending in the longitudinal direction into which guide pins 46 projecting from the lever casing 34 are entered, respectively, thereby enabling the lever 36 to move smoothly in the back-and-forth direction. The lever 36 is provided with a grip 48 at the front end which is gripped for pulling the lever 36.

The lever casing 34 is formed with pin-supporting grooves 50, 50 extending in the width direction in the bottom surface thereof. The rear ends of the seat-fixing pins 30, 30 are inserted into the pin-supporting grooves 50, 50, respectively.

The lock-releasing lever 36 is formed with two guide slits 52 extending in a diagonal direction crossing the longitudinal direction. The guide slits 52, 52 are formed in such a manner that the nearer to the rear end of the lever they are, the closer the distance therebetween is. The rear ends of the seat-fixing pins 30, 30 are passed through each guide slits 52, 52, respectively. As the lever 36 is moved in the back-and-forth direction, the seat-fixing pins 30, 30 are guided by the guide slits 52 so that the seat-fixing pins 30, 30 are moved in the width direction of the seat.

The lock-releasing lever 36 is formed with a slit 56 (FIG. 5) extending through the lever 36 in the width direction, through which a link bar 58 is inserted. The link bar 58 is provided for operating a stopper (a blocking member) 62 of a winder 60 as described later.

Figure 5:
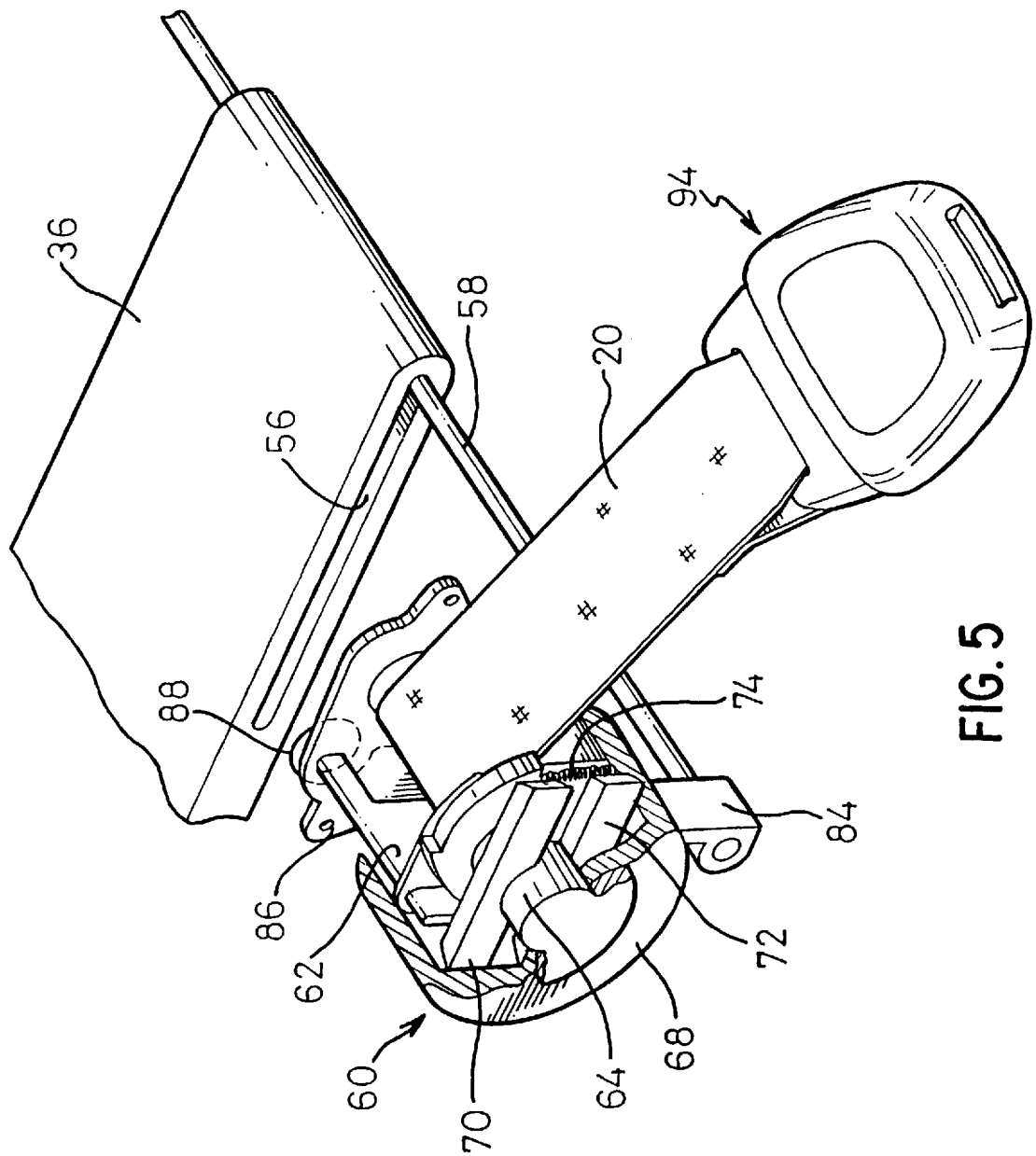
FIG. 5 is a perspective view of the structure of a winder.
Figure 6:
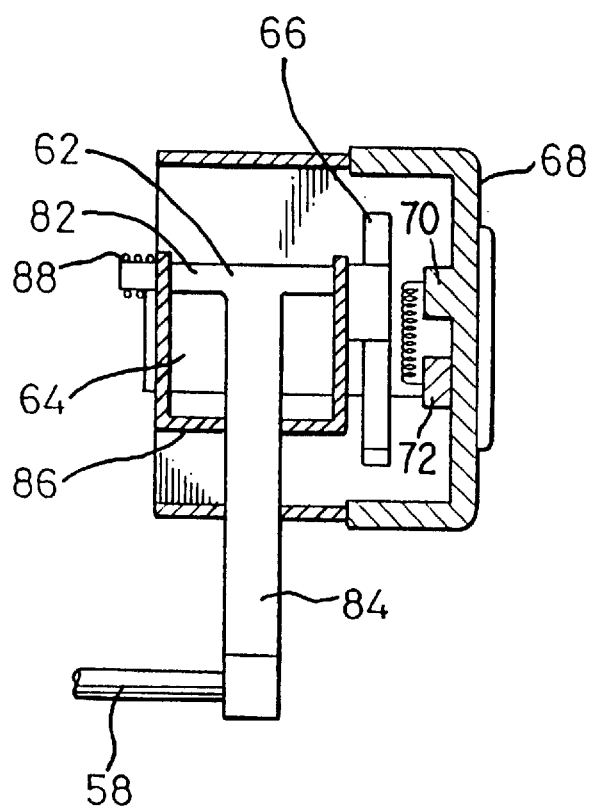
FIG. 6 is a vertical sectional view showing the structure of the winder.
Figure 7:
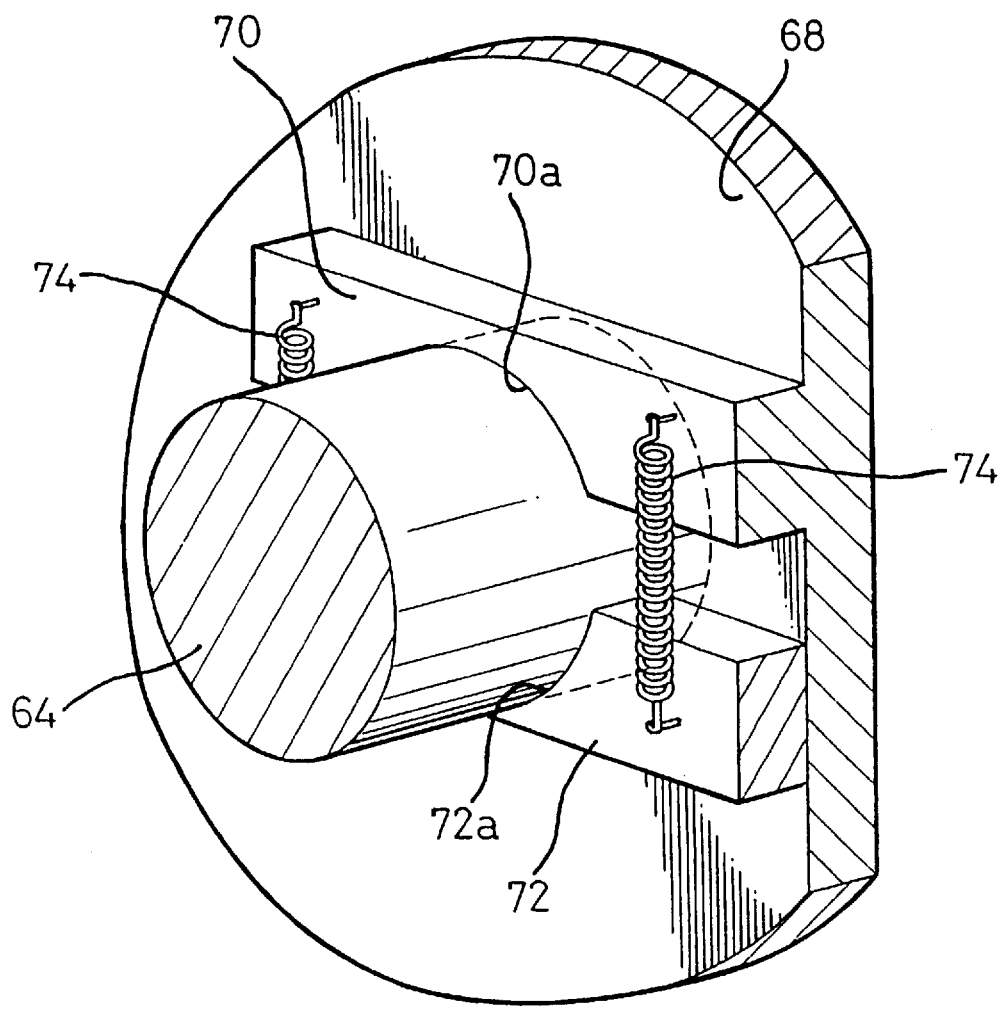
FIG. 7 is a perspective sectional view showing the structure of main parts of the winder.

The winder 60 comprises, as shown in FIGS. 5 through 7, a winding shaft 64 for the belt 20, a ratchet wheel 66 fixed to the winding shaft 64, a dial 68 for turning the winding shaft 64, and friction pieces 70, 72 for transmitting the torque of the dial 68 to the winding shaft 64.

The friction pieces 70 is fixed to the dial 68 and the friction piece 72 is biased to the friction piece 70 by a extension spring 74. The friction pieces 70, 72 have arclike concavities 70a, 72a formed in opposite surfaces thereof, respectively. The end of the winding shaft 64 is engaged with the concavities 70a, 72a so that the winding shaft 64 is clamped between the friction pieces 70, 72.

By gripping and turning the dial 68, the torque is transmitted from the friction pieces 70, 72 to the winding shaft 64 by the frictional force between the friction pieces and the winding shaft, thereby winding the belt 20 onto the winding shaft 64. As the tension on the belt 20 reaches a predetermined value, the inner surfaces of the concavities 70a, 72a slip relative to the surface of the winding shaft 64 so that no more torque is transmitted.

The ratchet wheel 66 has teeth 80 (FIG. 4) projecting from the outer surface thereof. The stopper 62 engages with one of the teeth 80, thereby preventing the rotation of the winding shaft 64 in the belt withdrawing direction.

The stopper 62 comprises a shaft portion 82 extending parallel to the axial direction of the winding shaft 64, and an arm portion 84 extending in a direction perpendicular to the axial direction of the winding shaft 64. The link bar 58 is connected to an end of the arm portion 84.

The shaft portion 82 is pivotally supported by a base 86 (FIGS. 5 and 6) of the winder. The stopper 62 is biased in a direction engaging with teeth 80 (the direction θ in FIG. 4) by a stopper-biasing spring 88 wound onto the shaft portion 82. As the lock-releasing lever 36 is pulled in a direction as indicated by the arrow A in FIG. 4, the link bar 58 pulls the arm portion 84 in a direction opposite to the direction θ so that the stopper 62 is released from the tooth 80. In this state, the ratchet wheel 66 and the winding shaft 64 are free to rotate.

The link bar 58 passes through an elongated hole 90 formed in the seat body 22 to project outside of the seat body 22. The base 86 of the winder 60 is fixed to the side of the seat body 22 and the arm portion 84 extends downward from the winder 60.

It should be noted that the winder 60 is provided on each of both right-and-left sides of the seat body 22. The seat-side belt 18 is also provided on each side of the vehicle seat 10, that is, two seat-side belts 18 are provided. A tongue (a latching member) 92 provided at an end of each seat-side belt 18 can latch to a buckle 94 provided at an end of each belt 20.

Hereinafter, the description will now be made as regard to the procedure for fixing the child seat 12 structured as mentioned above on the vehicle seat 10.

First, the child seat 12 is placed on the vehicle seat 10, the belts 20 are withdrawn from the winders 60 with the lock-releasing lever 36 being pulled, and the tongue 92 and the buckle 94 are latched each other. The buckles 94, 94 of the belts 20, 20 on the both sides of the seat body 22 are latched to the tongues 92, 92, respectively.

Then, the dial 68 is turned to wind the belt 20 with the child seat 12 being preferably pressed onto the vehicle seat 10. The winding is continued until the friction pieces 70, 72 slip relative to the winding shaft 64. Accordingly, the belt 20 is sufficiently wound such that the child seat 12 is securely fixed to the vehicle seat 10.

To adjust the reclining angle of the child seat 12 fixed to the vehicle seat 10 as mentioned above, the grip 48 is gripped to pull the lock-releasing lever 36. As the lock-releasing lever 36 starts to move forward, the seat-fixing pins 30 are guided by the guide slits 52 to come off the pin through holes 28 so that the seat body 22 is allowed to freely move relative to the guide rails 26. As the lock-releasing lever 36 is further pulled, the link bar 58 comes in contact with the rear end of the slit 56 as shown in FIG. 5 so that the link bar 58 is moved in a direction as indicated by the arrow B in FIG. 4. Accordingly, the arm portion 84 pivots in the direction as indicated by the arrow B so that the stopper 62 comes off the teeth 80. Then the winding shaft 64 becomes free so that the belt 20 is freely withdrawn from the winder 60.

In this state, the seat body 22 is moved to slide along the guide rails 26 to adjust the reclining angle thereof. Since the lock-releasing lever 36 is pulled by the extension spring 42, as the grip 48 is released from hand, when the seat-fixing pins 30 and the pin through holes 28 are confronted, the pins 30 are inserted into the through holes 28, thereby locking the seat body 22. When the seat body 22 is locked at the desired reclining angle, the child seat 12 is pushed onto the vehicle seat 10 and the dial 68 is turned to wind the belt 20.

As described above, only one motion of pulling the lock-releasing lever 36 is required to adjust the reclining angle of the seat body 22. Because, only the one motion can achieve the locking of the seat body 22 and the releasing of the locking of the winder 60, thereby facilitating the operation for adjusting the reclining angle.

To adjust the reclining angle of the seat body 22 in a direction laying the seat back of the seat body 22 down, the lock-releasing lever 36 is pulled enough as mentioned above to release the locking of the seat body 22 to the guide rails 26 and also to release the locking of the winder 60. To adjust the reclining angle of the seat body 22 in a direction standing the seat back of the seat body 22, it is enough to pull the lock-releasing lever 36 a little to release only the locking of the seat body 22 relative to the guide rails 26.

In this embodiment, since the torque of the dial 68 is transmitted to the winding shaft 64 through the friction pieces 70, 72, the desired tension can be applied to the belt 20 just by turning the dial 68 until the friction pieces 70, 72 slip. Since it is enough to turn the dial 68 until knowing that the friction pieces 70, 72 start to slip, user can know when the dial 68 is enough turned. Therefore, it is quite convenient for the user.

Though the belt 20 is employed as a webbing in the above embodiment, a wire, a rope, or a chain may be also employed.

As apparent from the above description, according to the present invention, the operation of the lock-releasing lever can achieve both the releasing of the locking of reclining and the releasing of the locking of the winder so that the reclining angle can be quite easily adjusted. In addition, the winder can be structured to be turned until the friction means such as friction pieces start to slip, user can know when the belt is enough wound, thereby facilitating the user to fix a child seat relative to a vehicle seat.

What is claimed is:

1. A child seat comprising:

a seat body in which a child is seated;

a frame supporting said seat body in such a manner said seat body can move in a reclining direction;

a locking means for locking the movement of said seat body in the reclining direction to fix the seat body to said frame; and a lock-releasing lever for releasing the locking of said locking means, and further comprising: a winder provided to said child seat for fixing said child seat to a vehicle body, a webbing being withdrawn from said winder and latched to a latching member of the vehicle seat, and a blocking means for blocking the withdrawal of said webbing from said winder, the blocking of the blocking means being released when said lock-releasing lever is moved in a lock releasing direction.

2. A child seat as claimed in claim 1, wherein the locking of the locking means of said seat body is first released, when the lock-releasing lever is moved in the lock releasing direction, and, after the locking being released, the blocking of said blocking means is released.

3. A child seat as claimed in claim 1, wherein said winder comprises:

a winding shaft onto which the webbing is wound, a handle for turning said winding shaft in a winding direction, a ratchet wheel which rotates integrally with said winding shaft and has teeth on the outer surface thereof, and a ratchet wheel stopper capable of being in an attitude engaging one of the teeth of said ratchet wheel to prevent the rotation of said winding shaft in a direction of withdrawing the webbing, and in another attitude spacing from the teeth to allow the rotation of the winder, said ratchet wheel stopper moving apart from the teeth by the movement of said lock-releasing lever in a lock-releasing direction.

4. A child seat as claimed in claim 3, wherein said child seat further comprises means for slipping the handle after torque transmitted from said handle to said winder reaches a predetermined value.

\* \* \* \* \*